No. 787,235. PATENTED APR. 11, 1905.
L. TRABUE.
BALING PRESS.
APPLICATION FILED FEB. 1, 1904.
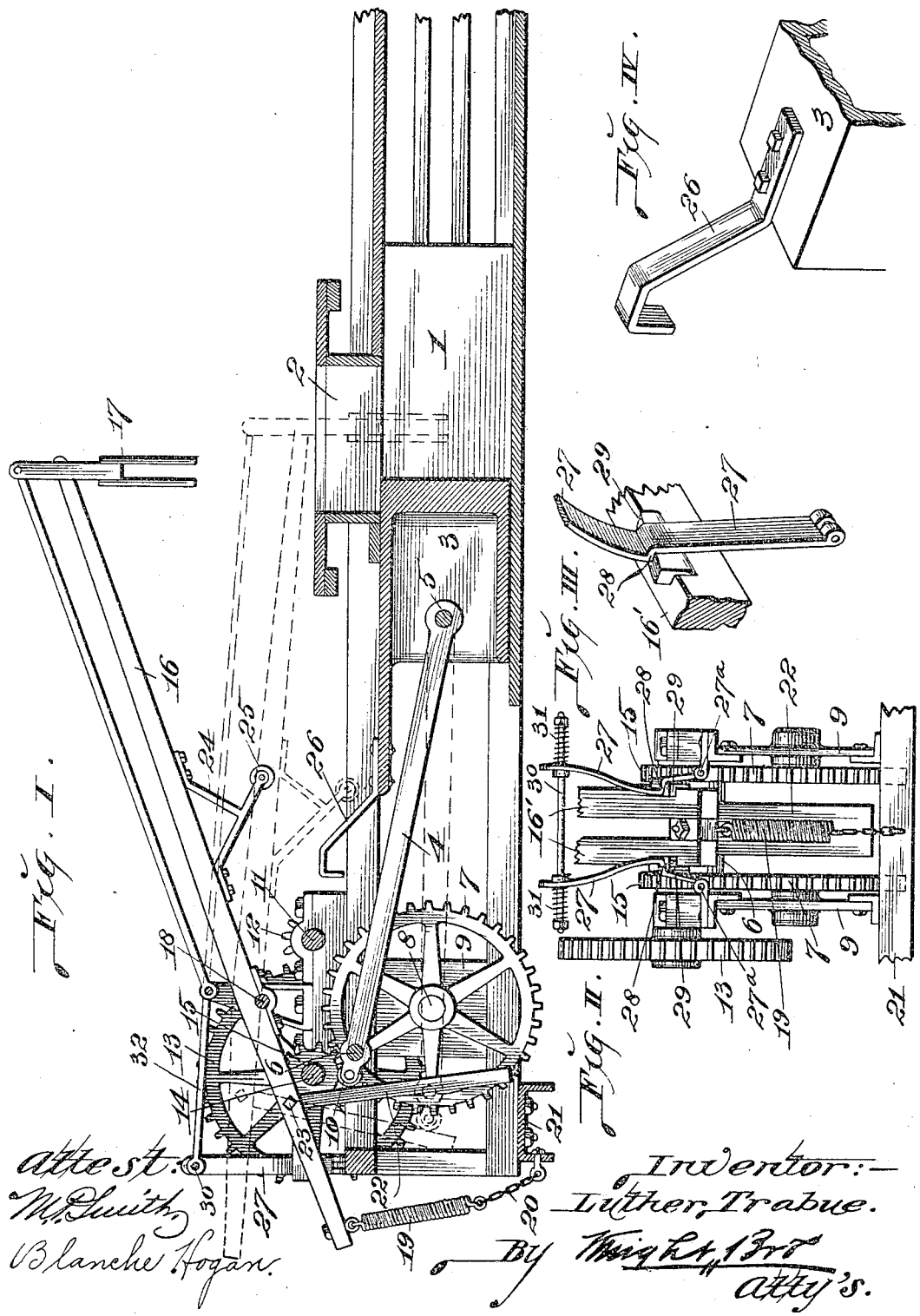
Attest:
M. Smith
Blanche Hogan.
Inventor:—
Luther Trabue.
By Wright Bro
Atty's No. 787,235.

Patented April 11, 1905.

UNITED STATES PATENT OFFICE.

LUTHER TRABUE, OF GIRARD, ILLINOIS.

BALING-PRESS.

SPECIFICATION forming part of Letters Patent No. 787,235, dated April 11, 1905.

Application filed February 1, 1904. Serial No. 191,489.

*To all whom it may concern:*

Be it known that I, LUTHER TRABUE, a citizen of the United States, residing in Girard, in the county of Macoupin and State of Illinois, have invented certain new and useful Improvements in Baling-Presses, of which the following is a full, clear, and exact description, reference being had to the accompanying drawings, forming part of this specification.

My invention relates to mechanism, in a baling-press, through the medium of which positive downward and return actions are imparted to the feeder of the press.

The invention further relates to means for yieldingly upholding the feeder after it has been elevated.

The invention consists in features of novelty hereinafter fully described, and pointed out in the claims.

Figure I is a longitudinal section of a baling-press containing my improvements. Fig. II is an elevation of the rear end of the press. Fig. III is a perspective view of one of the retaining-arms by which the feeder is upheld. Fig. IV is a perspective view of the inclined runway-arm carried by the plunger of the press and through the medium of which the feeder is assisted in its return movement after passing into the press-box.

1 designates the press-box of a baling-press, into which communication is furnished by the feed-opening 2.

3 is the plunger that operates in the feed-box 1 to compress the material being baled therein. Reciprocating motion is imparted to this plunger by a pitman 4, the forward end of which is pivotally connected to the plunger at 5. (See Fig. I.) The rear end of the pitman is loosely connected to a transverse shaft 6, that extends between and is fixed to a pair of gear-wheels 7, mounted on a rotatable supporting-shaft 8, journaled in uprights 9. Rotatably mounted in the rear end of the pitman 4 is a roller 10, the utility of which will be hereinafter set forth.

11 designates the main power-shaft of the baling-press, which is journaled in suitable bearings and extends transversely of the press. This drive-shaft bears a pinion 12, through the medium of which power is transmitted to a driven spur-wheel 13, fixed to a shaft 14.

15 designates pinions fixed to the shaft 14 and arranged in mesh with the pitman driving gear-wheels 7.

16 designates a vibratory feeder, preferably having two longitudinal side members 16' (see Figs. II and III) and bearing at its forward free end the packer 17. This feeder is vibratorily supported by a shaft 18, located intermediate of its ends.

19 is a retracting-spring connected to the rear end of the feeder 16 and also connected to the frame of the baling-press by any suitable means, such as the chain 20, that leads to a cross-bar 21, secured to the press-frame.

22 designates a leg fixed to the feeder 16 at 23 between the supporting-shaft 18 of the feeder and the point of connection of the spring 19. This leg is so positioned as to be in the path of travel of the roller 10, mounted in the rear end of the pitman 4.

24 designates a bracket fixed to the forward portion of the feeder 16 at its lower side, and 25 is a roller journaled in the lower end of said bracket.

26 is an inclined runway-arm that is secured to the plunger 3 and extends upwardly and rearwardly above the plunger. This runway-arm travels with said plunger and during the reciprocation thereof moves in a path beneath the bracket 24 and its roller 25.

27 designates a pair of catch-arms pivoted at 27ª to the frame of the baling-press at its rear end in the path of vertical travel of the rear end of the feeder 16. Each of these catch-arms is inclined inwardly and upwardly from its base and provided with a shoulder 28, located intermediate of the ends of the arm, as seen in Figs II and III. The arms 27 are designed to engage the rear ends of the feeder side members 16' when the feeder is in elevated position, and to avoid wear of said arms due to such arrangement I apply angle wear-blocks 29 to each feeder side member at the location of engagement of the catch. For the purpose of holding these catch-arms projected toward each other in the path of travel of the feeder 16 I connect their upper ends by a rod 30, passing loosely therethrough and bearing springs 31, that press against the catch-arms. The rod 30 is connected to the feeder-support by a brace 32.

In the practical use of my baling-press the operation is as follows: On each rearward stroke of the plunger 3, actuated through the medium of the pitman 4 and the gearing connected thereto, the roller 10 at the rear end of said pitman strikes against the leg 22, depending from the feeder 16, and by so doing forces said leg rearwardly to elevate the rear end of the feeder and cause downward travel of the forward end of the feeder. The packer 17 is thereby carried into the press-box 1. During this action the retracting-spring 19 is expanded on the upward movement of the rear end of the feeder, being thereby put under tension. The parts at this time assume the position indicated in dotted lines, Fig. I, the bracket 24 and its roller being located forward of the inclined runway-arm 26. As soon as the parts have reached the positions just described the pitman-carried roller 10 passes the lower end of the leg 22 during the travel of the gear-wheel-carried shaft 6, to which the pitman 4 is connected, and the plunger 3 is advanced on the forward reciprocation of the pitman 4. As the plunger advances the inclined runway-arm 26 strikes against the roller 25, carried by the feeder-bracket 24, thereby causing said roller to travel up the runway-arm and elevate the forward end of the feeder with positive action, thereby withdrawing the packer 17 from the press-box.

As soon as the upward movement is imparted to the packer 17 the retracting-spring 19, connected to the rear end of the feeder, being under tension acts to draw the rear end of the feeder downwardly and throw its forward end upwardly to the limit of its movement. When the feeder is raised into elevated position, the yielding catch-arms 27 spring into position over the rear ends of the feeder side members and engage them, thereby serving to uphold the feeder in a positive manner until the next rearward stroke of the plunger 3 occurs to again lower the feeder, at which time the feeder side arms are drawn away from engagement with the catch-arms 27 to descend as before.

I claim as my invention—

1. In a baling-press, the combination of a vibratory feeder, means for elevating said feeder, and spring-pressed catch-arms for engagement with said feeder to hold it in elevated position, substantially as set forth.

2. In a baling-press, the combination of a vibratory feeder, means for starting the elevation of said feeder, spring-pressed catch-arms for engagement with said feeder to hold it in elevated position, and a retracting-spring for completing the elevation of said feeder, substantially as set forth.

LUTHER TRABUE.

In presence of—
H. K. BROWN,
T. W. STARKAY.